(12) United States Patent
Huang (10) Patent No.: US 8,526,609 B1
(45) Date of Patent: Sep. 3, 2013

(54) METHOD FOR REAL-TIME COMPOSITING OF ENCRYPTED VIDEO STREAMS WITHOUT DECRYPTION

(75) Inventor: Andrew Shane Huang, Singapore (SG)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 13/531,443

(22) Filed: Jun. 22, 2012

Related U.S. Application Data (60) Provisional application No. 61/500,136, filed on Jun. 23, 2011.

(51) Int. Cl.
*H04N 7/00* (2006.01)
(52) U.S. Cl.
USPC ............. 380/200; 380/201; 380/212; 725/31; 713/193; 348/554; 348/263; 348/500
(58) Field of Classification Search
USPC ........... 380/200, 201, 212; 725/31; 713/193; 348/544, 263, 500
See application file for complete search history.

(56) References Cited

U.S. PATENT DOCUMENTS

| | | | | |
|---|---|---|---|---|
| 5,155,595 | A * | 10/1992 | Robison | 348/500 |
| 5,694,588 | A * | 12/1997 | Ohara et al. | 712/225 |
| 5,801,785 | A * | 9/1998 | Crump et al. | 348/563 |
| 2005/0097598 | A1* | 5/2005 | Pedlow et al. | 725/31 |
| 2006/0209892 | A1* | 9/2006 | MacMullan et al. | 370/468 |
| 2007/0220279 | A1* | 9/2007 | Northcutt et al. | 713/193 |
| 2007/0237332 | A1* | 10/2007 | Lyle | 380/263 |
| 2008/0095364 | A1* | 4/2008 | Candelore et al. | 380/212 |
| 2009/0251605 | A1* | 10/2009 | Hsiao | 348/554 |
| 2010/0172497 | A1* | 7/2010 | Candelore et al. | 380/200 |
| 2011/0150216 | A1* | 6/2011 | Barry et al. | 380/201 |

* cited by examiner

*Primary Examiner* — Beemnet Dada
*Assistant Examiner* — Sayed Beheshti Shirazi
(74) *Attorney, Agent, or Firm* — Schwegman Lundberg & Woessner, P.A.

(57) ABSTRACT

A system, method and device for real-time compositing of encrypted video streams without having to decrypt each video stream is disclosed herein. A shared encryption key is derived to encrypt multiple incoming video streams to an encrypted master video stream, while retaining full interoperability with popular incumbent video encryption standards. Compositing video is then possible without having to decrypt the master video stream, thereby preserving the security of the copyrighted material. The invention preferably genlocks a digital video source to a master video stream.

18 Claims, 7 Drawing Sheets

METHOD FOR REAL-TIME COMPOSITING OF ENCRYPTED VIDEO STREAMS WITHOUT DECRYPTION

CROSS REFERENCE TO RELATED APPLICATION

The Present Application claims priority to U.S. Provisional Patent Application No. 61/500,136, filed on Jun. 23, 2011, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to digital compositing. More specifically, the present invention relates to a method for real-time compositing of encrypted video streams without decryption.

2. Description of the Related Art

The transmission of digital video has become more commonplace with the standardization of digital video interfaces such as Displayport, HDMI and DVI. Likewise, the encryption of transmitted video has also become more commonplace. The encryption of over-the-cable video has created a problem for people who wish to composite video (e.g. picture-in-picture, or PIP) in real-time. Since the introduction of encrypted video, the market for non-display devices that can composite encrypted digital video has been non-existent.

The obvious method for compositing video would be to decrypt each of the video streams, perform the compositing operation, and then re-encrypt the streams. However, this creates an issue with copyrights and the Digital Millennium Copyright Act (DMCA), as it is infeasible to obtain express permission from every potential copyright holder to decrypt video simply for the purpose of a compositing operation. The only allowed reason to decrypt video is for the lawful presentation of the video upon a display device; hence it has been infeasible to build over-the-cable compositors that operate on encrypted video upstream of a display device.

General definitions to be used in the present application include the following.

High-Definition Multimedia Interface ("HDMI") is a compact audio/video interface for transmitting uncompressed digital data.

Transition-minimized differential signaling ("TMDS") is a technology for transmitting high-speed serial data and is used by the DVI and HDMI video interfaces, as well as other digital communication interfaces.

High-bandwidth Digital Content Protection ("HDCP") is a digital protection to prevent copying of digital audio and video content as the content is transmitted from one device/source to another. Intel Corporation has published HDCP Specification along with several Revisions which detail techniques for protecting digital content to be transmitted from a source device to a presentation device. In September of 2010, an HDCP master key that allows for the generation of valid device keys was released to the public.

Red, Green, Blue ("RGB") color model is the adding of the three colors together to produce a wide array of colors, and the RGB color model is used for the sensing, representation, and display of images in electronic systems, such as televisions and computers.

Display Data Channel ("DDC") is a collection of digital communication protocols between a computer and a graphics display that enables the display to communicate supported display models to an adapter and to enable the computer host to adjust monitor parameters, such as brightness and contrast.

Genlock is a common technique where the video output of one source, or a specific reference signal from a signal generator is used to synchronize other television picture sources together.

Chromeless browser is a web browser wherein the scroll bars and title bar are hidden off screen.

Musunuri et al., U.S. Patent Publication Number 20090213267 for a Video Synchronization System, discloses genlocking one or more video sources based on a generated clock signal.

Larson, U.S. Patent Publication Number 20090141800 for Transmitting Video Streams, discloses coordinating the transmission of intra-frames of a first video stream with transmission of intra-frames of a second video stream.

Aleksic et al., U.S. Patent Publication Number 20080278606 for Image Compositing, discloses a video image received in portions, combined with a second image and encoded.

Kalva et al., U.S. Patent Publication Number 20100158099 for Systems And Method For Video/Multimedia Rendering, Composition, And User Interactivity, discloses presenting a multimedia element with and during a decoding of an encoded video.

Anderson, U.S. Patent Publication Number 20100248817 for Streaming Video For Electronic gaming Machines With Real-Time Interactive Control discloses real-time compositing video images with local images for gaming.

Gorzynski et al., U.S. Patent Publication Number 20110025819 for Compositing Video Streams, discloses compositing video streams for video conference.

Gausereide, U.S. Patent Publication Number 20110008017 for Real Time Video Inclusion System, discloses compositing in real time a local video stream from a web camera with an external video feed, for commercial advertising purposes.

Reinoso et al., U.S. Patent Publication Number 20090225983 for a System And Method For Improved Processing And Decoding Of An Encrypted Digital Video Signal, discloses storing the location of an encryption portion of a video stream in an unencrypted portion of the video stream to facilitate the efficient location and use of the encrypted portion of the video stream.

Therefore, in order to create a practical solution that can be broadly deployed and not run afoul of copyright issues, all incoming video sources must be synchronized and encrypted to the same key, and the compositing must happen in the cipher text domain with no involvement of decryption.

BRIEF SUMMARY OF THE INVENTION

The present invention provides a method for real-time compositing of encrypted video streams without having to decrypt each video stream. A shared encryption key is derived to encrypt multiple incoming video streams to an encrypted master video stream, while retaining full interoperability with popular incumbent video encryption standards. Compositing video is then possible without having to decrypt the master video stream, thereby preserving the security of the copyrighted material. Furthermore, the method genlocks (a technique which synchronizes frame rates) a digital video source to a master video stream.

One aspect of the present invention is a method for real-time compositing of an encrypted video stream without decryption of the encrypted video stream. The method includes transmitting an encrypted digital video from an encrypted video source to a video compositor. The method also includes transmitting an unencrypted video to the video compositor. The method also includes compositing the unencrypted video with the encrypted digital video without decrypting the encrypted video to create a composite video. The method also includes transmitting the composite video to a display device. The method also includes displaying a content of the composite video at the display device.

Another aspect of the present invention is a system for real-time compositing of an encrypted video stream without decryption of the encrypted video stream. The system includes an encrypted video source, a display device, and a video compositor. The encrypted video source comprises an encrypted digital video. The video compositor is connected to the encrypted video source and the display device. The video compositor is also connected to a source of an unencrypted video. The video compositor is configured to composite the unencrypted video with the encrypted digital video without decrypting the encrypted video to create a composite video. The video source also transmits the composite video to the display device for display.

Yet another aspect of the present invention is a video compositor for real-time compositing of an encrypted video stream without decryption of the encrypted video stream. The video compositor includes a first input port, a second input port, a first output port, a deserializer, a line buffer, a frame synchronization and composite logic engine, an encryption engine, a compositing multiplexer and a serializer. The deserializer is connected to the first input port, and the deserializer is configured to deserialize an encrypted digital video. The line buffer is connected to the second input port to receive an unencrypted video and to absorb slack of a frame. The frame synchronization and composite logic engine observes an unencrypted synchronization signal embedded within an encrypted video stream and determines a synchronization frame rate. The encryption engine encrypts the unencrypted video to match the encryption of the encrypted video. The compositing multiplexer composites the unencrypted video with the encrypted video to generate a composite video. The serializer is connected to the first output port and to the compositing multiplexer for serializing the composite video.

Yet another aspect of the present invention is a method for real-time compositing of an audio with an encrypted video stream without decryption of the encrypted video stream. The method includes transmitting an encrypted digital video from an encrypted video source to a video compositor. The method also includes transmitting an unencrypted audio to the video compositor. The method also includes compositing the unencrypted audio with the encrypted digital video without decrypting the encrypted video to create a composite video. The method also includes transmitting the composite video to a display device. The method also includes displaying a content of the composite video at the display device.

Yet another aspect f the present invention is a system for real-time compositing of an audio with an encrypted video stream without decryption of the encrypted video stream. The system includes an encrypted video source, a display device, and a video compositor. The encrypted video source comprises an encrypted digital video. The video compositor is connected to the encrypted video source and the display device. The video compositor is also connected to a source of an unencrypted audio. The video compositor is configured to composite the unencrypted audio with the encrypted digital video without decrypting the encrypted video to create a composite video. The video source also transmits the composite video to the display device for display.

Yet another aspect of the present invention is a video compositor for real-time compositing of an audio with an encrypted video stream without decryption of the encrypted video stream. The video compositor includes a first input port, a second input port, a first output port, a deserializer, a line buffer, a frame synchronization and composite logic engine, an encryption engine, a compositing multiplexer and a serializer. The deserializer is connected to the first input port, and the deserializer is configured to deserialize an encrypted digital video. The line buffer is connected to the second input port to receive an unencrypted audio and to absorb slack of a frame. The frame synchronization and composite logic engine observes an unencrypted synchronization signal embedded within an encrypted video stream and determines a synchronization frame rate. The encryption engine encrypts the unencrypted audio to match the encryption of the encrypted video. The compositing multiplexer composites the unencrypted audio with the encrypted video to generate a composite video. The serializer is connected to the first output port and to the compositing multiplexer for serializing the composite video.

Yet another aspect of the present invention is a process for compositing an incoming protected video stream with at least one unprotected input video stream. The process includes synchronizing a pixel timing or a cipher timing of an incoming protected video stream. The process also includes encrypting an unprotected video stream using a synchronized cipher. The process also includes passing to a receiver selectively either a plurality of protected video pixels or a plurality of encrypted pixels from the unprotected video stream based on a color of the unprotected video stream (chroma key). The process also includes generating a compositing effect. Preferably, the compositing effect is generated without circumventing any copyright controls.

Yet another aspect of the present invention is a system for compositing digital video streams. The system includes a video compositing device and a video controller connected to the video compositing device. The video compositing device includes input ports, a multiplexer, an output port, a first socket and a second socket. Each of the input ports receives a digital video stream. The multiplexer composites each of the digital video streams into a composite video. The output port transmits the composite video. The first socket inputs a protected or unprotected video stream. The second socket outputs a protected or unprotected video stream. The second socket is integrated with a CPU. The CPU comprises a RAM, a ROM, and a network connection.

The CPU preferably comprises chromeless browser to generate a visual user interface using a web browser. The CPU preferably runs a web server that accepts incoming HTTP requests. The web browser is preferably configured to match a background color to that of a chroma key, whereby web pages are rendered transparent and appear the same as the incoming protected video stream. The web server is also preferably configured to accept incoming events that are queued for compositing onto the video in the form of a banner that scrolls across a screen. The video compositing device is preferably configured to use an auto-hiding banner during a quiet period to prevent interference with a user's video.

Yet another aspect of the present invention is a method for compositing digital streams. The method includes fetching dynamic content from the internet at a digital compositor device. The method also includes receiving a live video stream at the digital compositor device. The method also includes overlaying dynamic content from the internet on top of the live video stream.

The overlay is preferably performed using a dynamic marquee that selectively interrupts the live video. The overlay is alternatively performed using a transient UI notion that selectively interrupts the live video.

Yet aspect of the present invention is a method for matching users with advertisers in a marketplace. The method includes collecting data for each of a plurality of users of a television accessory device, each of the users corresponding to a television accessory device. The method also includes bidding for advertisement slots for video streams transmitted to the television accessory device of each of the plurality of users. The method also includes placing advertisements in advertisement slots for video streams transmitted to the television accessory device of each of the plurality of users according to the bidding.

Yet another aspect of the present invention is a method for compositing digital streams. The method includes logging into an internet service. The method also includes extracting a plurality of messages from the internet service. The method also includes receiving a live video stream at the digital compositor device. The method also includes overlaying the plurality of messages from the internet service on top of the live video stream.

Yet another aspect of the present invention is a device for manipulating advertisements in a real-time digital video stream. The device includes an input port for receiving a real-time digital video stream comprising content and a plurality of advertisement slots, a second input for receiving a plurality of new advertisements, a multiplexer for compositing a new advertisement of the plurality of new advertisements into an advertisement slot of the plurality of advertisement slots to generate a composite video, an output port for transmitting the composite video.

Yet another aspect of the present invention is a device for manipulating advertisements in a real-time digital video stream. The device includes an input port for receiving a real-time digital video stream comprising content and a plurality of advertisement slots, a detection engine configured to detect each of the plurality of advertisement slots in the real-time digital stream and configured to block each of the plurality of advertisement slots in the real-time digital stream to generate a composite video, and an output port for transmitting the composite video.

Yet another aspect of the present invention is a method for determining the content of a broadcast video stream. The method includes selecting a channel on a cable box via a CEC bus and correlating the channel against public TV guides by a zip code to a content of the broadcast video stream.

Yet another aspect of the present invention is a method for determining the content of a broadcast video stream. The method includes decrypting selectively an audio feed of a broadcast video stream, and correlating the audio feed against a plurality of matched filters for certain key words, tones, or jingles to determine a content of the broadcast video stream.

Yet another aspect of the present invention is a method for determining the content of a broadcast video stream. The method includes sampling the ambient audio feed of a broadcast video stream using a microphone, and correlating the audio feed against a plurality of matched filters for certain key words, tones, or jingles to determine a content of the broadcast video stream.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

An HDMI cable consists of at least two sets of signals: TMDS (Transition Minimized Differential Signaling) video data, which is a high-speed, unidirectional serialized data format for digital transmission of video, and the DDC (Display Data Channel), which is a low-speed bidirectional serialized data format for the negotiation of control and encryption data.

Figure 1:
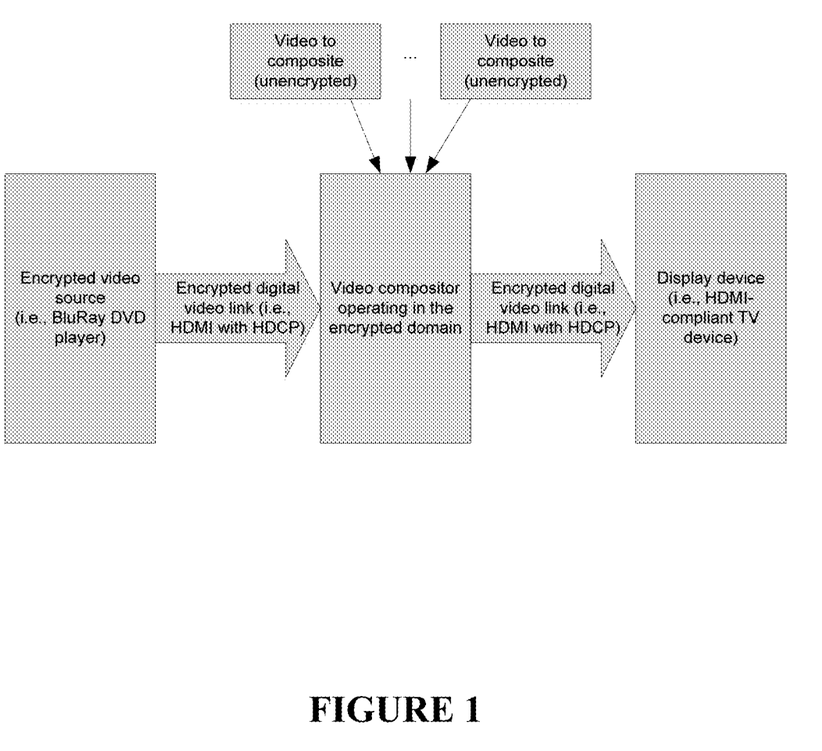
FIG. 1 is a block diagram of a high level functional video compositor.
Figure 2:
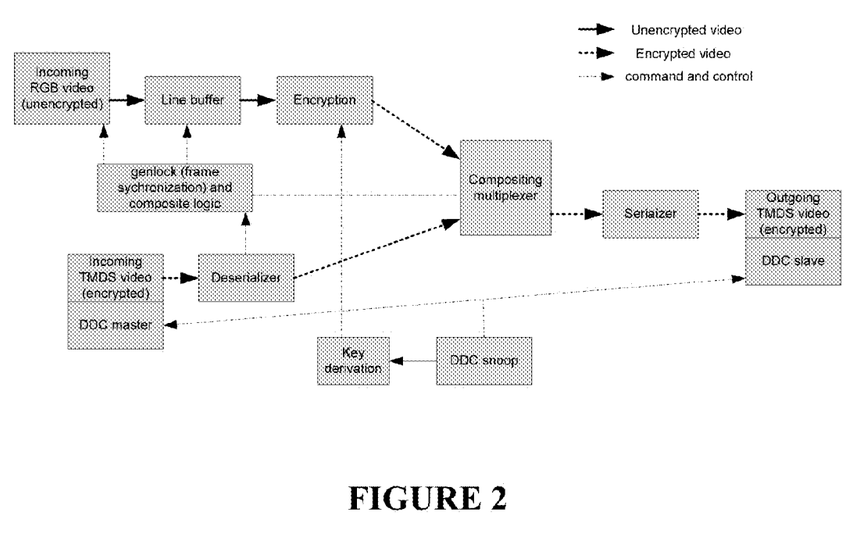
FIG. 2 is a block diagram illustrating a system of a video compositor operating in the encrypted domain.
Figure 3:
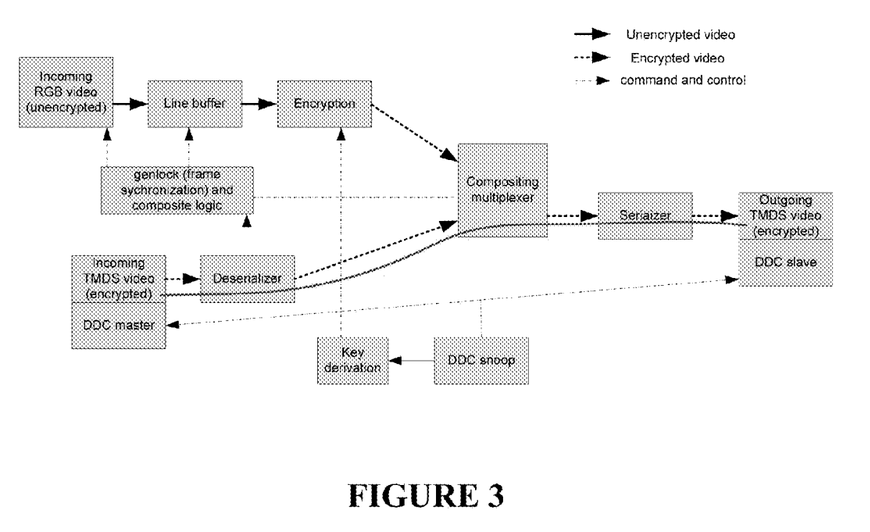
FIG. 3 is a block diagram illustrating a system of the present invention operating in comparison to a system shown in FIG. 2.
Figure 4:
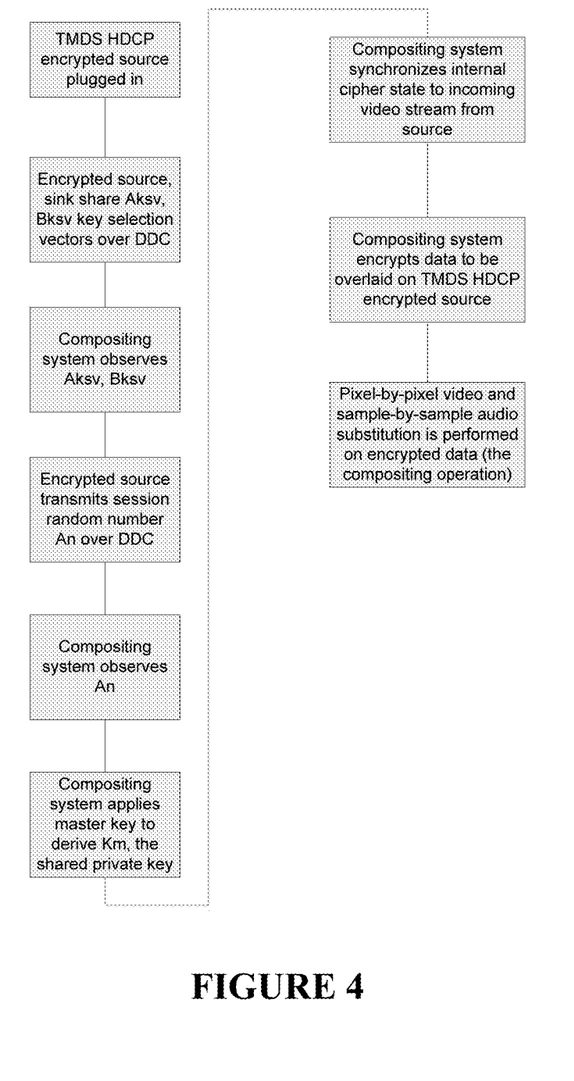
FIG. 4 is a flow chart of the general flow of the present invention.
Figure 5:
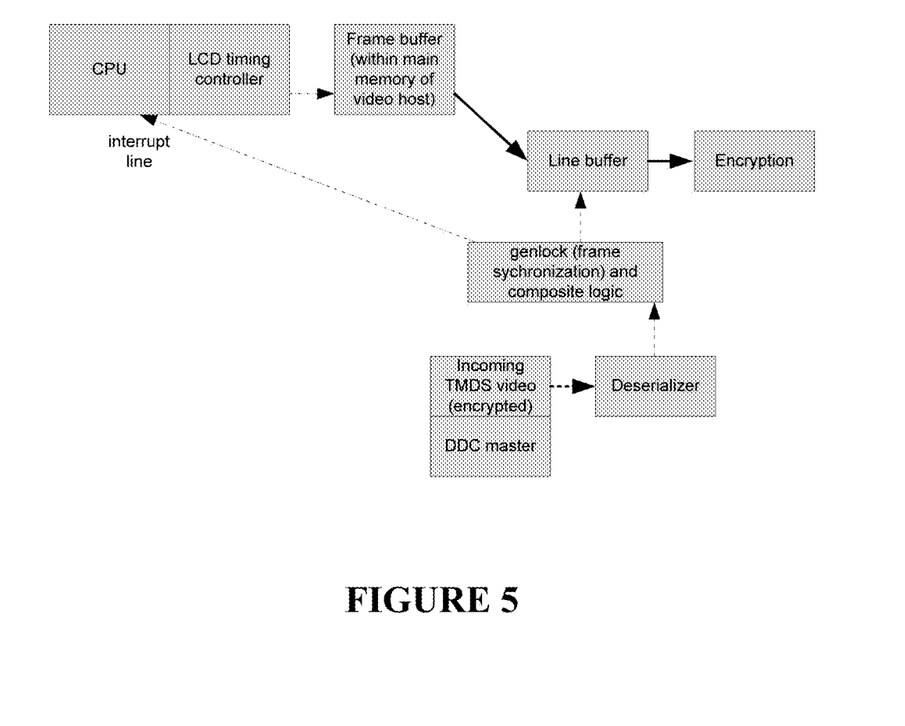
FIG. 5 is a block diagram illustrating a detail of genlocking.

The basic video flow path, as shown in FIG. 2, is for the incoming TMDS source video to be deserialized (this is not a decryption operation, the video data is still scrambled after deserialization), passed through a compositing multiplexer which will select, on a pixel by pixel basis, which encrypted stream to pass on to the sink, and then serialized for retransmission to the TMDS video sink.

The basic control path is between the DDC master, which is within the video source, and the DDC slave, which is within the video sink.

This basic video flow is enhanced by this invention through the addition of a video source to be composited over the encrypted video path. The video source is typically a parallel RGB digital data stream that would be characteristic of the type that may be driven directly into a conventional LCD. This stream is unencrypted. The video source for compositing is trained to synchronize its frame rate to the incoming encrypted TMDS video stream; this is done by observing the unencrypted synchronization signals embedded within the encrypted TMDS video stream, and informing the CPU that is responsible for controlling the LCD when a frame starts. There is a line buffer between the unencrypted incoming video and compositing operation to absorb any slack that can occur over the duration of a frame due to stalls in data transfers and long term clock-drift issues between the CPU and the incoming TMDS video stream.

The basic control flow is enhanced by this invention through the addition of a DDC snooper that can observe the negotiations occurring over the DDC. The snooper will observe the shared keys (Aksv, Bksv) and session random number (An) and relay these to a key derivation block. The key derivation block applies a set of mathematical operators to derive the shared private key. The mathematical operation is the dot product of the respective Ksv multiplied by the 40×40 matrix of the HDCP master key, modulo $2^{56}$. The HDCP master key matrix is inverted depending upon the derivation of source or sink keys. The result of this operation is the 40×1 private key vector for each of the devices. The Km session encryption key is then computed by the dot product of the public 40-bit KSV and the 40×1 private key vector, modulo $2^{56}$. The resulting Km and the observed An is then fed into the standard HDCP cipher.

The shared private key is then fed into an encryption cipher stream generator.

Once the cipher streams are synchronized and keyed with the same key as the incoming encrypted TMDS video stream, the compositing operation can begin.

The compositing operation itself is a trivial multiplexor that simply picks, on a pixel-by-pixel basis, which stream to send on to the video sink. Since both streams are encrypted and synchronized to the same cipher stream, the decryption of the streams is transitive and the resulting video data is unscrambled for both the original incoming encrypted TMDS video stream, and the composited RGB data stream. The same technique can be applied precisely to overlaying audio into the HDMI stream, since a similar transport, encryption, and synchronization method is used for the same.

One embodiment of the present invention is a video compositing device, which overlays video onto an encrypted digital video stream. The video compositing device receives the overlay video source from a "video port", and the video source can be derived from multiple devices. The video compositing device may use multiple sources of video, some frame buffered, some line buffered, and the source need not be on-board sources. In one simple form, the video compositing device only composites the video and, optionally receives the overlay from a computing device, such as a laptop computer.

Figure 6:
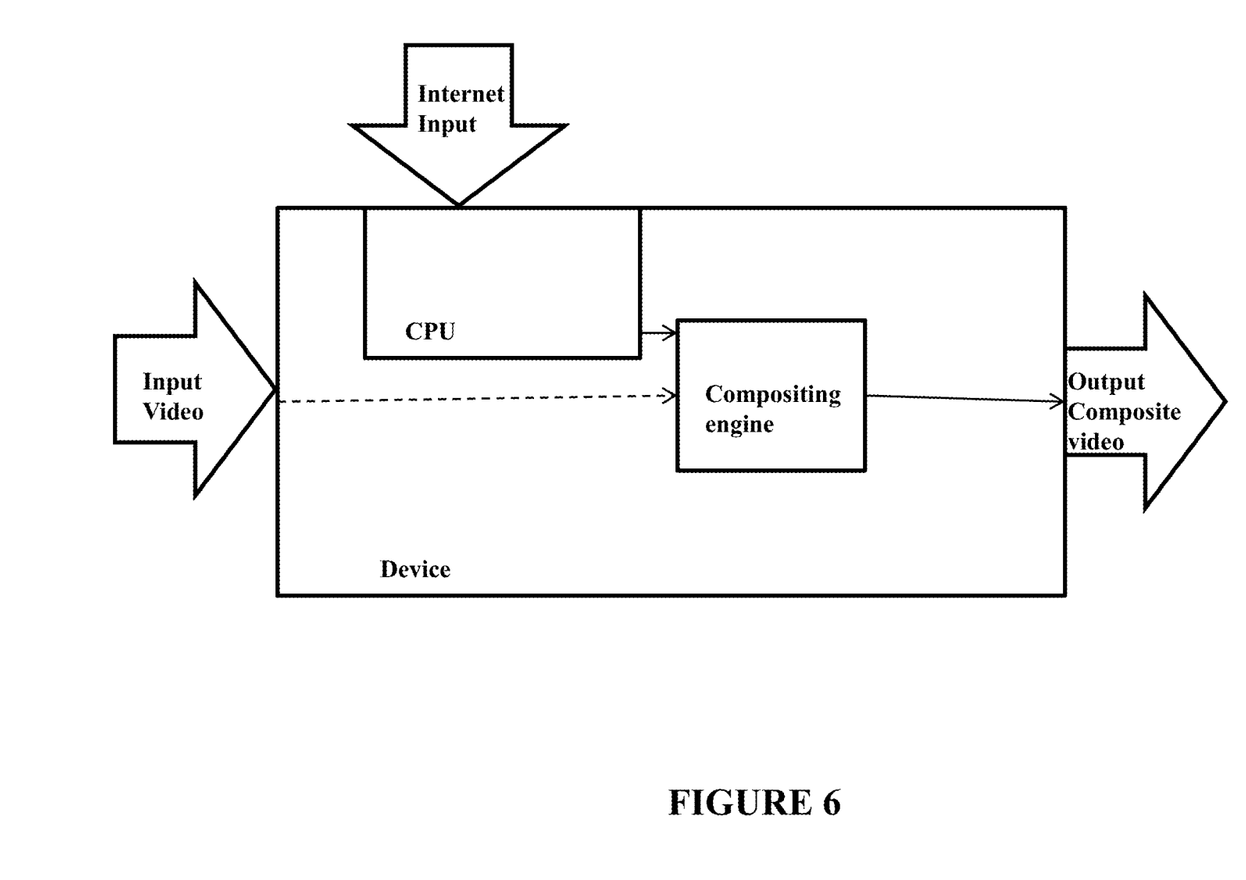
FIG. 6 is a schematic diagram of an alternative embodiment of a video compositing device.

One preferred embodiment of the present invention is a video compositing device with an integrated LINUX computer. In this preferred embodiment, the "video port" is occupied by an integrated embedded computer with a network connection. FIG. 6 illustrates a schematic diagram of a video compositing device with an integrated LINUX computer that is connected to the internet and receives a digital video feed at input ports and generates a composite video for an output port in which the composite video is a live digital video feed with overlay of content from the internet.

Figure 7:
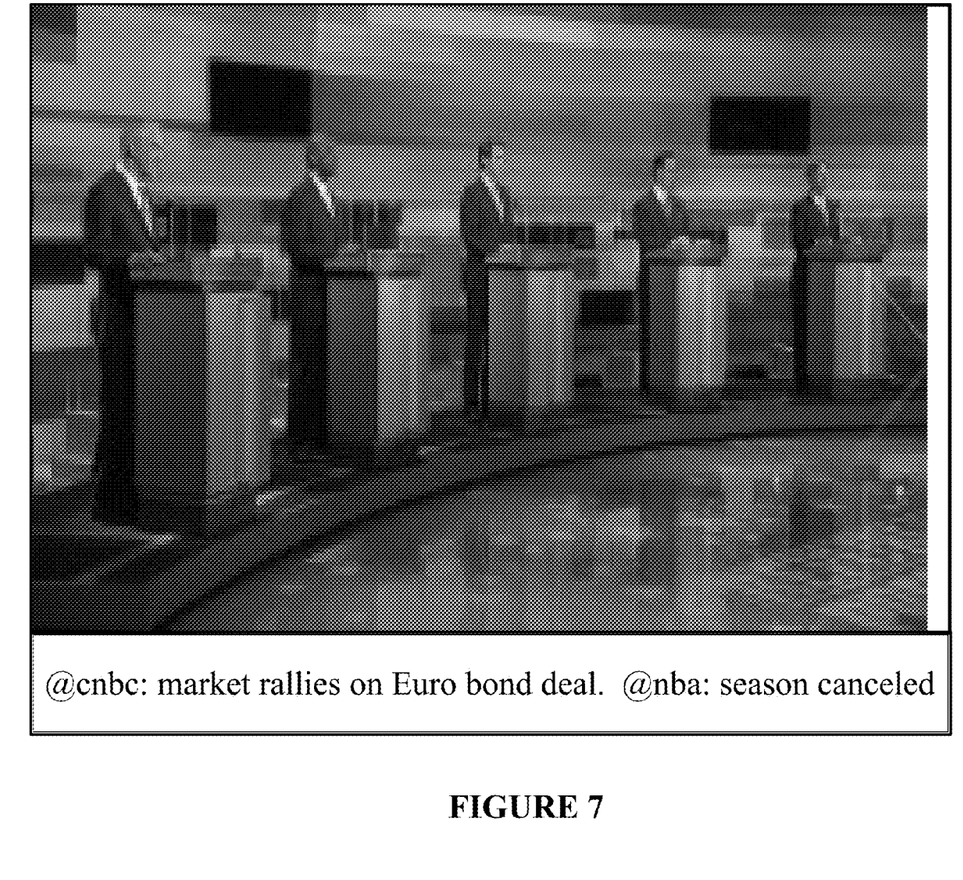
FIG. 7 is an illustration of a live video feed with an overlay of a twitter feed.

Another embodiment of the present invention is a system makes a television or other display device more interactive. In this embodiment, users go "over the top" and overlay live network chat over broadcast video feeds. In one example, a user can tune into a favorite TV show, select a twitter feed, and watch the tweets (twitter messages) scroll by on the screen while watching the favorite TV show on the same screen. FIG. 7 illustrates an example of a live video feed with an overlay of a twitter feed. Basically, this embodiment is the combination of dynamic internet content with dynamic TV content, in a time-synchronized fashion. The idea of watching twitter comments overlaid at the same time as a live presidential debate. The video compositing device allows the video feed to be modified which permits the overlaying of the twitter feed (or other similar feed) onto a screen of a display device.

Yet another embodiment of the present invention is a device used to detect and replace advertisements with new ones, or to block advertisements altogether, in live video feeds. This embodiment renders every advertisement slot in a broadcast video into a piece of time that can be resold on a secondary market (e.g., advertisers bidding through the owner/operator of the present invention for advertisement slots, instead of paying to broadcasters), and each advertisement slot parceled out in a very intimate, user-targetable fashion using the present invention. Users could also configure the present invention to simply mute ads.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A method for real-time compositing of an encrypted video stream without decryption of the encrypted video stream, the method comprising:
   receiving, by a hardware processor, an encrypted digital video from an encrypted video source at a video compositor;
   receiving, by the hardware processor, an unencrypted video at the video compositor; and
   compositing the unencrypted video with the encrypted digital video without decrypting the encrypted video to create a composite video;
   dynamically interpreting an exchange of descriptive information of a plurality of capabilities of an output device; and
   dynamically overriding the plurality of capabilities of the output device to downgrade a serial link for compatibility by oversampling the serial link by a defined factor, whereby a dynamic override of the serial link is enabled without disruption to a normal operation of the serial link;
   wherein compositing the unencrypted video with the encrypted digital video includes:
   deserializing the encrypted digital video;
   determining shared key selection vectors and a session random number of the encrypted digital video;
   deriving a shared private key from the shared key selection vectors and a session random number of the encrypted digital video;
   encrypting the unencrypted video using the derived shared private key; and
   selecting composited video on a pixel-by-pixel basis from the encrypted digital video and the now-encrypted unencrypted video.

2. The method according to claim 1 wherein the composite video provides a picture-in-picture output.

3. The method according to claim 1 wherein the encrypted digital video is transmitted from the encrypted video source to the video compositor with a HDMI cable.

4. A system for real-time compositing of an encrypted video stream without decryption of the encrypted video stream, the system comprising:
   an encrypted video source providing an encrypted digital video;
   a display device configured for displaying a video;
   a hardware video compositor connected to the encrypted video source and the display device, the video compositor also connected to a source of an unencrypted video, the video compositor compositing the unencrypted video with the encrypted digital video without decrypting the encrypted video to create a composite video, and transmitting the composite video to the display device for display, wherein the video compositor composites the unencrypted video with the encrypted digital video by performing operations to:

deserialize the encrypted digital video;

determine shared key selection vectors and a session random number of the encrypted digital video;

derive a shared private key from the shared key selection vectors and a session random number of the encrypted digital video;

encrypt the unencrypted video using the derived shared private key; and select the composite video on a pixel-by-pixel basis from the encrypted digital video and the now-encrypted unencrypted video;

wherein the video compositor dynamically interprets an exchange of descriptive information of a plurality of capabilities of the display device; and wherein the video compositor dynamically overrides the plurality of capabilities of the display device to downgrade a serial link for compatibility by oversampling the serial link by a defined factor, whereby a dynamic override of the serial link is enabled without disruption to a normal operation of the serial link.

5. A device for compositing digital video streams, the device comprising:

a plurality of input ports, the plurality of input ports receiving respective digital video streams, the digital video streams including an encrypted stream and a unencrypted stream;

a hardware multiplexer arranged to composite each of the digital video streams into a composite video by performing operations to:

deserialize encrypted digital video from the encrypted stream;

determine shared key selection vectors and a session random number of the encrypted digital video;

derive a shared private key from the shared key selection vectors and a session random number of the encrypted digital video;

encrypt unencrypted video from the unencrypted stream using the derived shared private key; and select the composite video on a pixel-by-pixel basis from the encrypted digital video and the now-encrypted unencrypted video; and an output port for transmitting the composite video to an output device;

wherein the device dynamically interprets an exchange of descriptive information of a plurality of capabilities of the output device; and wherein the device dynamically overrides the plurality of capabilities of the output device to downgrade a serial link for compatibility by oversampling the serial link by a defined factor, whereby a dynamic override of the serial link is enabled without disruption to a normal operation of the serial link.

6. The device according to claim 5 wherein one of the plurality of input ports and the output supports a form of content protection of a digital video stream.

7. The device according to claim 6 wherein the device observes a key exchange between a content protected input digital video stream and a content protected output digital video stream, and wherein the device utilizes the information from the key exchange to synchronize an internal cipher state to one identical to that of the content protected input digital video stream.

8. The device according to claim 6 wherein the device synchronizes to a pixel level, the timing of a plurality of non-content protected input digital video streams to that of the content protected input digital video stream.

9. The device according to claim 8 further comprising a genlock circuit having a vertical blanking interrupt sent to a synchronously-clocked host video interface to initiate a pixel readout from a video controller.

10. The device according to claim 9 further comprising a shallow elastic buffer to absorb an innate timing jitter within the pixel readout trigger mechanism of the synchronously-clocked host video interface.

11. The device according to claim 8 further comprising a genlock circuit hold a single video frame or a plurality of video frames, the genlock circuit combined with a coarse timing mechanism to trigger a pixel readout from a host.

12. The device according to claim 6 further comprising a circuit to dynamically interpret the exchange of descriptive information and to dynamically override the plurality of capabilities of the output device.

13. The device according to claim 12 wherein the circuit is a Display Data Channel (DDC).

14. The device according to claim 6 further comprising a circuit to dynamically override the plurality of capabilities of the output device, wherein the circuit comprises a pull-down component and a pull-up component with ballasting to prevent damage to a transmitter.

15. The device according to claim 6 further comprising a circuit to dynamically override the plurality of capabilities of the output device, wherein the serial link is oversampled by a factor of at least 100.

16. The device according to claim 7 wherein the public keys of the content protected input digital video stream and the content protected output digital video stream are used to derive a plurality of private keys through a master key, and the plurality of private keys are combined with the public keys to create a shared secret used to synchronize cipher states between a protected source of the input digital video stream and an internal cipher matched to that of the protected source.

17. The device according to claim 6 wherein the device automatically detects a resolution of the content protected digital video stream, and the device reports the resolution dynamically to the plurality of input ports, wherein each of the plurality of input ports rescale a frame buffer to match the size of the content protected digital video stream.

18. The device according to claim 6 wherein the device automatically detects a resolution of the content protected digital video stream, and the device dynamically resizes the plurality of non-content protected digital video streams to an appropriate format and timing for pixel-matched encryption.

* * * * *